(12) United States Patent
Feng et al.

(10) Patent No.: US 9,540,242 B2
(45) Date of Patent: Jan. 10, 2017

(54) METHOD FOR MAKING CARBON NANOTUBE FILM

(71) Applicant: Beijing FUNATE Innovation Technology Co., LTD., Beijing (CN)

(72) Inventors: Chen Feng, Beijing (CN); Li Qian, Beijing (CN); Yu-Quan Wang, Beijing (CN); Liang Liu, Beijing (CN)

(73) Assignee: Beijing FUNATE Innovation Technology Co., LTD., Beijing (CN)

( * ) Notice: Subject to any disclaimer, the term of this patent is extended or adjusted under 35 U.S.C. 154(b) by 492 days.

(21) Appl. No.: 13/740,259

(22) Filed: Jan. 13, 2013

(65) Prior Publication Data

US 2013/0285289 A1    Oct. 31, 2013

(30) Foreign Application Priority Data

Apr. 25, 2012   (CN) .......................... 2012 1 0122627

(51) Int. Cl.

| | |
|---|---|
| *C01B 31/02* | (2006.01) |
| *B29C 67/24* | (2006.01) |
| *H01B 1/04* | (2006.01) |
| *B82Y 30/00* | (2011.01) |
| *B82Y 40/00* | (2011.01) |

(52) U.S. Cl.
CPC ........... *C01B 31/0253* (2013.01); *B29C 67/24* (2013.01); *B82Y 30/00* (2013.01); *B82Y 40/00* (2013.01); *C01B 31/022* (2013.01); *C01B 31/024* (2013.01); *H01B 1/04* (2013.01)

(58) Field of Classification Search
None
See application file for complete search history.

(56) References Cited

U.S. PATENT DOCUMENTS

| | | | |
|---|---|---|---|
| 8,815,397 | B2 | 8/2014 | Jiang et al. |
| 2009/0167708 | A1 | 7/2009 | Jiang et al. |
| 2009/0167710 | A1 | 7/2009 | Jiang et al. |
| 2009/0267000 | A1* | 10/2009 | Chen et al. ................ 250/492.1 |
| 2009/0311489 | A1 | 12/2009 | Sheehan et al. |
| 2010/0124646 | A1 | 5/2010 | Jiang et al. |
| 2011/0036828 | A1 | 2/2011 | Feng et al. |

(Continued)

FOREIGN PATENT DOCUMENTS

| | | |
|---|---|---|
| CN | 101458975 | 6/2009 |
| CN | 101790490 | 7/2010 |

(Continued)

*Primary Examiner* — Benjamin Schiffman
(74) *Attorney, Agent, or Firm* — Zhigang Ma

(57) ABSTRACT

A method for making a carbon nanotube film includes the following steps. An original carbon nanotube film is provided and includes a number of carbon nanotubes substantially joined end-to-end by van der Waals force and oriented along a first direction. A patterned carbon nanotube film is formed and defines a number of through holes arranged in at least one row in the first direction, the through holes of the at least one row includes at least two spaced though holes. The patterned carbon nanotube film is treated with a solvent such that the patterned carbon nanotube film is shrunk into the carbon nanotube film includes a number of spaced carbon nanotube linear units and a number of carbon nanotube groups, and the carbon nanotube groups are joined with the carbon nanotube linear units by van der Waals force.

15 Claims, 13 Drawing Sheets

(56) References Cited

U.S. PATENT DOCUMENTS

| | | |
|---|---|---|
| 2011/0095237 A1 | 4/2011 | Liu et al. |
| 2011/0135894 A1 | 6/2011 | Liu et al. |
| 2011/0147715 A1* | 6/2011 | Rogers et al. ............ 257/24 |
| 2011/0155295 A1* | 6/2011 | Fan et al. ............... 156/60 |
| 2011/0171419 A1 | 7/2011 | Li et al. |
| 2011/0253907 A1 | 10/2011 | Qian et al. |

FOREIGN PATENT DOCUMENTS

| | | |
|---|---|---|
| CN | 101850961 | 10/2010 |
| CN | 102086035 | 6/2011 |
| TW | 200928912 | 7/2009 |
| TW | 201020208 | 6/2010 |
| TW | 201020209 | 6/2010 |
| TW | 201107548 | 3/2011 |
| TW | 201121877 | 7/2011 |
| TW | 201137919 | 11/2011 |

\* cited by examiner

_US 9,540,242 B2_

METHOD FOR MAKING CARBON NANOTUBE FILM

RELATED APPLICATIONS

This application claims all benefits accruing under 35 U.S.C. §119 from China Patent Application No. 201210122627.5, filed on Apr. 25, 2012 in the China Intellectual Property Office, the disclosure of which is incorporated herein by reference.

BACKGROUND

1. Technical Field

The present disclosure relates to a method for making a carbon nanotube film.

2. Discussion of Related Art

A transparent conductive film has characteristics of high electrical conductivity, low electrical resistance, and good light penetrability. The transparent conductive film is widely used in liquid crystal display, touch panel, electrochromic devices, and airplane windows.

The conventional methods for forming the transparent conductive film include a vacuum evaporation method and a magnetron sputtering method. The drawbacks of these methods include complicated equipment, high cost and being unsuitable for mass production. Furthermore, these methods require a high-temperature annealing process which will damage a substrate on which the transparent conductive film is formed. The substrate with a low melting point cannot be used for forming the film. Thus, the conventional methods have their limitations.

Carbon nanotubes have excellent electrical conductivity. A carbon nanotube film made of the carbon nanotubes, which is prepared by drawing a carbon nanotube array, has good electrical conductivity and a certain transparence. The spaces between adjacent carbon nanotubes in the carbon nanotube film are small. Thus, the transparence of the carbon nanotube film is low, which is not conducive for wide applications.

What is needed, therefore, is to provide a method for making a carbon nanotube film with high transparence, to overcome the above shortages.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
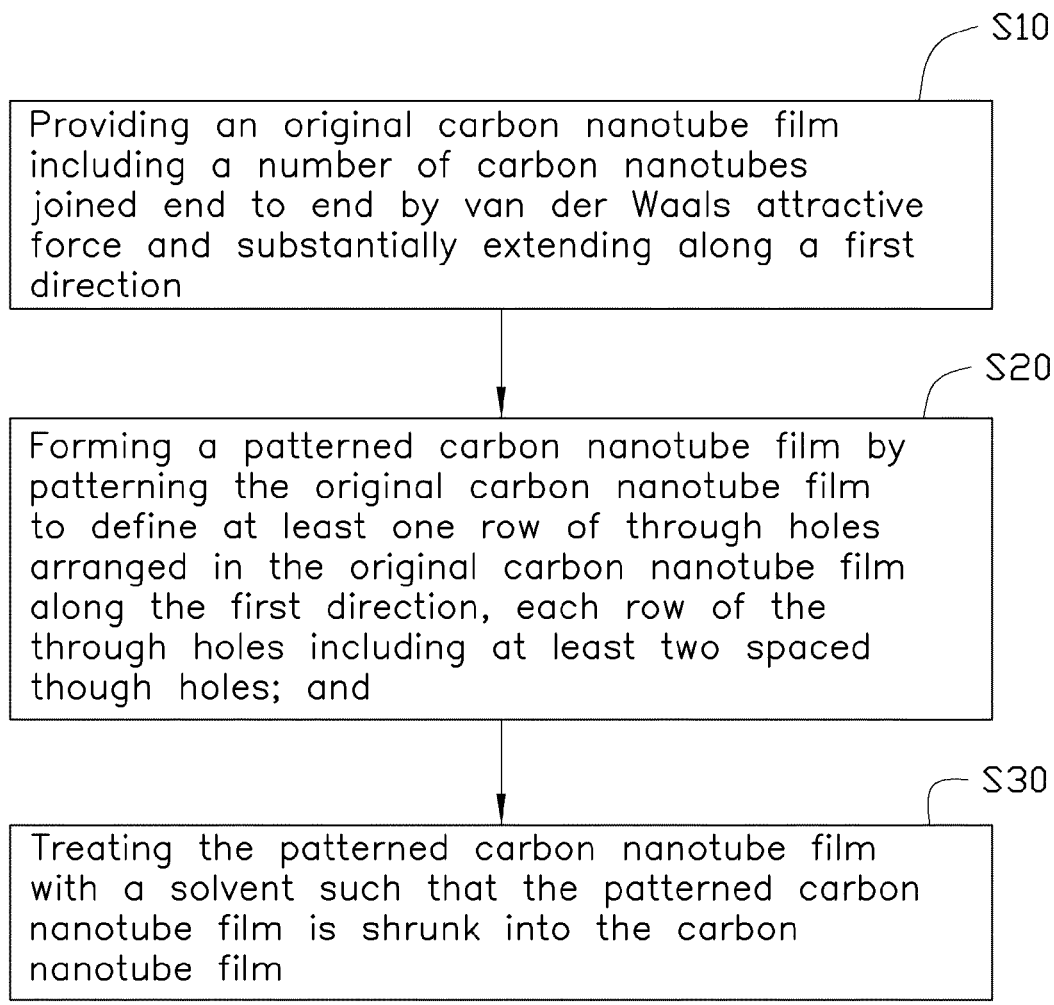
FIG. 1 is a flow chart of one embodiment of a method for making a carbon nanotube film.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

One embodiment of a carbon nanotube film is provided. The carbon nanotube film includes a number of carbon nanotube linear units and a number of carbon nanotube groups. The carbon nanotube linear units are spaced from each other. The carbon nanotube groups join with the carbon nanotube linear units by van der Waals force. The carbon nanotube groups located between adjacent carbon nanotube linear units are separated from each other.

The carbon nanotube linear units substantially extend along a first direction, and are separated from each other along a second direction crossed with the first direction. A shape of each carbon nanotube linear unit intersection can be a semi-circle, circle, ellipse, oblate, or other shapes. In one embodiment, the carbon nanotube linear units are substantially parallel to each other, and distances between adjacent carbon nanotube linear units are substantially equal. The carbon nanotube linear units are substantially coplanar. An effective diameter of each carbon nanotube linear unit is larger than or equal to 0.1 micrometers, and less than or equal to 100 micrometers. In one embodiment, the effective diameter of each carbon nanotube linear unit is larger than or equal to 5 micrometers, and less than or equal to 50 micrometers. Distances between adjacent carbon nanotube linear units are not limited and can be selected as desired. In one embodiment, the distances between adjacent carbon nanotube linear units are greater than 0.1 millimeters. Diameters of the carbon nanotube linear units can be selected as desired. In one embodiment, the diameters of the carbon nanotube linear units are substantially equal. Each carbon nanotube linear unit includes a number of first carbon nanotubes substantially extending along the first direction. Adjacent first carbon nanotubes extending along the first direction are joined end to end by Van der Waals attractive force. In one embodiment, an axis of each carbon nanotube linear unit is substantially parallel to the axis of first carbon nanotubes in each carbon nanotube linear unit.

The carbon nanotube groups are separated from each other and combined with adjacent carbon nanotube linear units by van der Waals force along the second direction. The carbon nanotube film can be a free-standing structure. The "free-standing structure" means than the carbon nanotube film can sustain its sheet-shaped structure without any supporter. In one embodiment, the carbon nanotube groups arranged along the second direction are separated from each other by the carbon nanotube linear units. The carbon nanotube groups arranged along the second direction also connect with the carbon nanotube linear units.

In one embodiment, the carbon nanotube groups can be interlacedly located in the second direction and disorderly arranged in the second direction. As such, the carbon nanotube groups in the second direction form non-linear conductive paths. In one embodiment, the carbon nanotube groups are arranged into columns in the second direction, thus the carbon nanotube groups form consecutive and linear conductive paths in the second direction. In one embodiment, the carbon nanotube groups in the carbon nanotube film are arranged in an array. A length of each carbon nanotube group in the second direction is substantially equal to the distance between its adjacent carbon nanotube linear units. The length of each carbon nanotube group on the second direction is greater than 0.1 millimeters. The carbon nanotube groups are also spaced from each other along the first direction. Spaces between adjacent carbon nanotube groups in the first direction are greater than or equal to 1 millimeter.

The carbon nanotube group includes a number of second carbon nanotubes joined by van der Waals force. Axes of the second carbon nanotubes can be substantially parallel to the first direction or the carbon nanotube linear units. The axis of the second carbon nanotubes can also be crossed with the first direction or the carbon nanotube linear units such that the second carbon nanotubes in each carbon nanotube group are crossed into a network structure.

The carbon nanotube film includes a number of carbon nanotubes. The carbon nanotubes can be made into carbon nanotube linear units and carbon nanotube groups. In one embodiment, the carbon nanotube film consists of the carbon nanotubes. The carbon nanotube film defines a number of apertures. Specifically, the apertures are mainly defined by the separate carbon nanotube linear units and the spaced carbon nanotube groups. The arrangement of the apertures is similar to the arrangement of the carbon nanotube groups. In the carbon nanotube film, if the carbon nanotube linear units and the carbon nanotube groups are orderly arranged, the apertures are also orderly arranged. In one embodiment, the carbon nanotube linear units and the carbon nanotube groups are substantially arranged as an array, the apertures are also arranged as an array. A ratio of an area sum of the carbon nanotube linear units and the carbon nanotube groups to an area of the apertures is less than or equal to 1:19. In other words, in the carbon nanotube film, a ratio of the area of the carbon nanotubes to the area of the apertures is less than or equal to 1:19. In one embodiment, in the carbon nanotube film, the ratio of the total sum area of the carbon nanotube linear units and the carbon nanotube groups to the area of the apertures is less than or equal to 1:49. Therefore, a transparence of the carbon nanotube film is greater than or equal to 95%. In one embodiment, the transparence of the carbon nanotube film is greater than or equal to 98%.

The carbon nanotube film is an anisotropic conductive film. The carbon nanotube linear units form first conductive paths along the first direction, as the carbon nanotube linear units extend along the first direction. The carbon nanotube groups form second conductive paths along the second direction. Therefore, a resistance of the carbon nanotube film along the first direction is different from a resistance of the carbon nanotube film along the second direction. The resistance of the carbon nanotube film along the second direction is over 10 times greater than the resistance of the carbon nanotube film along the first direction. In one embodiment, the resistance of the carbon nanotube film along the second direction is over 20 times greater than the resistance of the carbon nanotube film along the first direction. In one embodiment, the resistance of the carbon nanotube film along the second direction is about 50 times greater than the resistance of the carbon nanotube film along the first direction. In the carbon nanotube film, the carbon nanotube linear units are joined by the carbon nanotube groups on the second direction, which makes the carbon nanotube film strong and stable.

It is noted that there can be a few carbon nanotubes surrounding the carbon nanotube linear units and the carbon nanotube groups in the carbon nanotube film. However, these few carbon nanotubes have a small and negligible effect on the carbon nanotube film properties.

Referring to FIG. 1, one embodiment of a method for making the carbon nanotube film includes the following steps:

S10, providing an original carbon nanotube film including a number of carbon nanotubes joined end to end by van der Waals attractive force and substantially extending along a first direction;

S20, forming a patterned carbon nanotube film by patterning the original carbon nanotube film to define at least one row of through holes arranged in the original carbon nanotube film along the first direction, each row of the through holes including at least two spaced though holes; and S30, treating the patterned carbon nanotube film with a solvent such that the patterned carbon nanotube film is shrunk into the carbon nanotube film.

Figure 2:
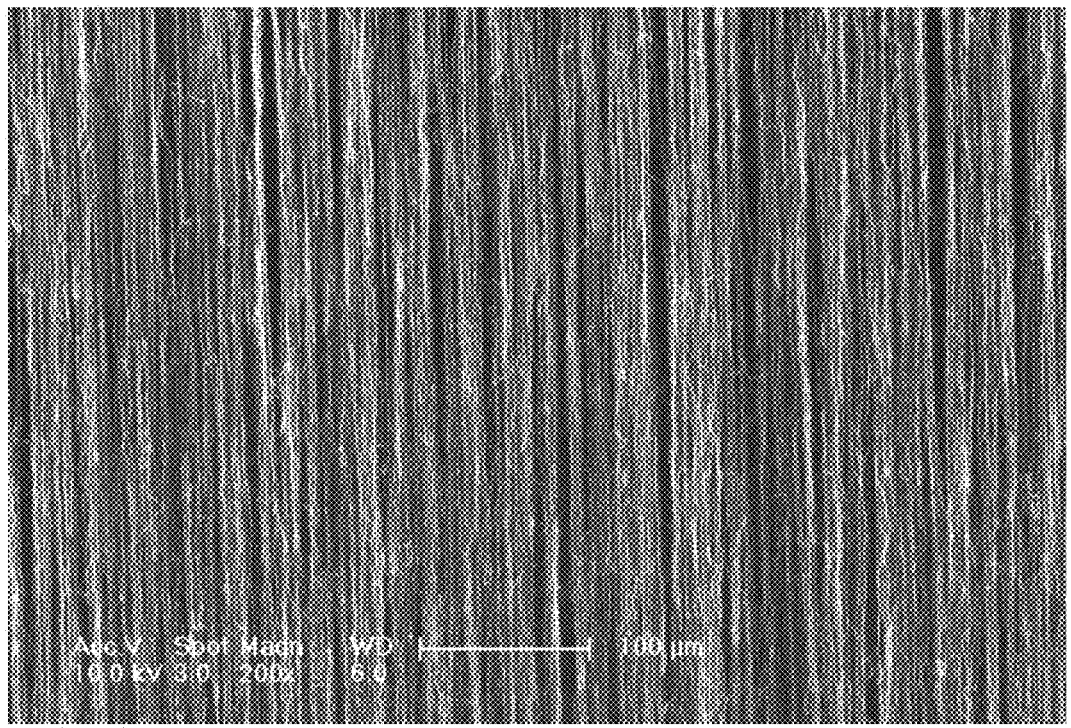
FIG. 2 is a scanning electron microscope (SEM) image of an original carbon nanotube film.

In step S10, the original carbon nanotube film can be shown in FIG. 2. The original carbon nanotube film can be obtained by drawing from a carbon nanotube array substantially along the first direction. Specifically, the original carbon nanotube film can be made by the steps of: providing the carbon nanotube array including a number of substantially parallel carbon nanotubes; and selecting carbon nanotubes from the carbon nanotube array and pulling the selected carbon nanotubes substantially along the first direction, thereby forming the original carbon nanotube film.

In one embodiment, the carbon nanotube array is formed on a substrate, and the carbon nanotubes in the carbon nanotube array are substantially perpendicular to the substrate. During the pulling process, as the initial carbon nanotubes are drawn out and separated from the substrate, other carbon nanotubes are also drawn out end to end due to van der Waals force between ends of adjacent carbon nanotubes. This process of pulling produces the original carbon nanotube film with a certain width. The extending direction of the carbon nanotubes in the original carbon nanotube film is substantially parallel to the pulling direction of the original carbon nanotube film. Therefore, the original carbon nanotube film consists of carbon nanotubes, and the carbon nanotubes are combined by van der Waals force. The carbon nanotube film is a free-standing structure. The carbon nanotubes in the original carbon nanotube film define a number of micropores, and effective diameters of the micropores are less than 100 nanometers.

The step S20 is mainly used to form spaced through holes arranged along the first direction in the original carbon nanotube film. The original carbon nanotube film can be patterned by using laser beams or electron beams irradiate the original carbon nanotube film.

In one embodiment, the original carbon nanotube film is patterned by laser beams, and the step S20 includes the following sub-steps. A laser is provided. An irradiating path of a laser beam emitted from the laser can be controlled by a computer. A shape of the original carbon nanotube film having the though holes are inputted into the computer, which controls the irradiating path of the laser beam. The laser irradiates the original carbon nanotube film to form the through holes. A power density of the laser beam ranges from about 10000 watts per square meter to about 100000 watts per square meter and a moving speed of the laser beam ranges from about 800 millimeters per second (mm/s) to about 1500 mm/s. In one embodiment, the power density is in a range from about 70000 watts per square meter to about 80000 watts per square meter, and the moving speed is in a range from about 1000 mm/s to about 1200 mm/s.

In step S20, a shape of each through hole can be a circle, ellipse, triangle, quadrangle, or other shapes. The quadrangle shape can have at least one pair of parallel sides, such as a parallelogram, trapezia, rectangle, square, or rhombus. In one embodiment, the shape of each through hole is rectangular. In another embodiment, the shape of the through hole is a straight line, which can be considered as a rectangle with a narrow width. An effective diameter of the through hole is larger than the effective diameter of the micropore in the original carbon nanotube film. In one embodiment, the effective diameter of the through hole is larger than or equal to 0.1 millimeters. A space between adjacent through holes is larger than the effective diameter of the micropore in the original carbon nanotube film. In one embodiment, the space between adjacent through holes is larger than or equal to 0.1 millimeters. The shape and effective diameter of the through hole and the space between adjacent through holes can be selected as desired.

Figure 3:
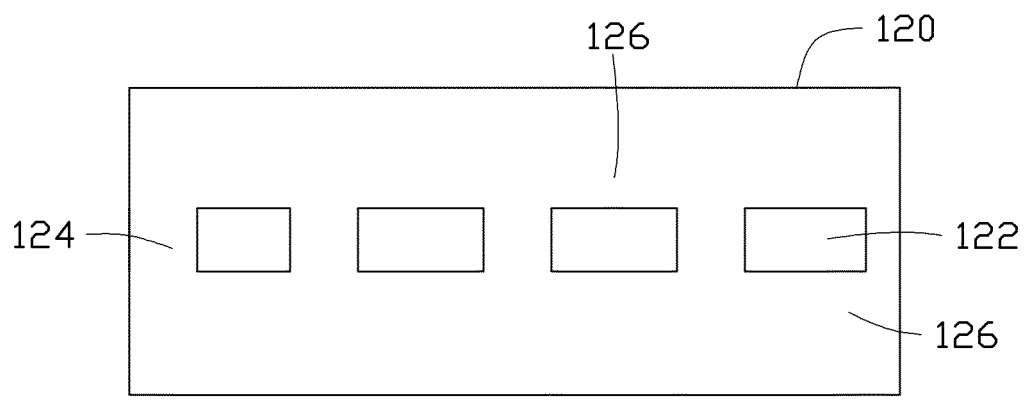
FIG. 3 is a schematic view of the original carbon nanotube film shown in FIG. 2 with through holes substantially arranged in a row.

In step S20, the patterned carbon nanotube film can be divided into a number of connecting parts and at least two extending parts by the through holes. The connecting parts are located between adjacent through holes in each row. The connecting parts are separated from each other along the first direction by the through holes. The at least two extending parts substantially extend along the first direction. The at least two extending parts are connected with each other on the second direction by the connecting parts. Therefore, the at least two extending parts and the connecting parts are an integrated structure. Specifically, structures of the patterned carbon nanotube films can be described as follow:

(1) Referring to FIG. 3, a number of through holes 122 are separately formed in an original carbon nanotube film 120. The through holes 122 are arranged into only one row along a first direction X. The first direction X is substantially parallel to the extending direction of the carbon nanotubes in the original carbon nanotube film 120. The original carbon nanotube film 120 can be divided into a number of connecting parts 124 and two extending parts 126 by the through holes 122. The connecting parts 124 are parts of the original carbon nanotube film 120 between adjacent through holes 122 in the same row. The two extending parts 126 are parts of the original carbon nanotube film 120 except the connecting parts 124.

The connecting parts 124 are separated from each other by the though holes 122. The connecting parts 124 and the though holes 122 in the same row are alternately arranged. The two extending parts 126 are located on opposite sides of the connecting parts 124. The extending parts 126 are divided by the connecting parts 124 along a second direction Y crossed with the first direction X. In one embodiment, the second direction Y is substantially perpendicular to the first direction X. Each extending part 126 extends along the first direction X.

Figure 4:
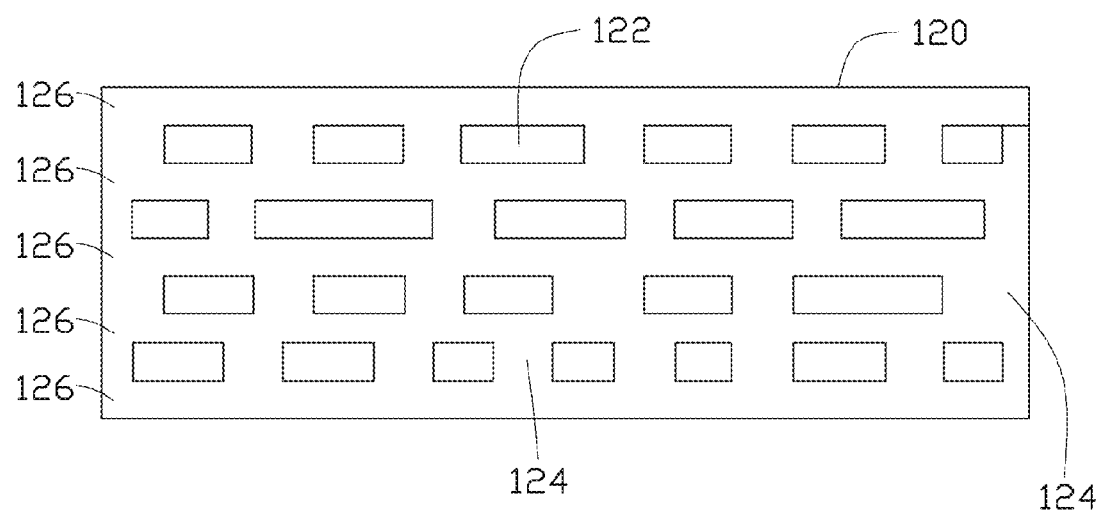
FIG. 4 is a schematic view of the original carbon nanotube film shown in FIG. 2 with through holes substantially arranged in a number of rows.

(2) Referring to FIG. 4, a number of through holes 122 are arranged into a number of rows in the original carbon nanotube film 120. The through holes 122 in the same row are spaced from each other along the first direction X. The through holes 122 are interlaced with each other along the second direction Y. That is, the through holes 122 in the second direction Y are not arranged in a straight line. It can be understood that the through holes 122 in the second direction Y can also be arranged in columns, and the through holes 122 in the same column are spaced from each other. The through holes 122 can be arranged as an array.

The original carbon nanotube film 120 is divided into a number of connecting parts 124 and a number of extending parts 126 by the through holes 122. Every adjacent connecting parts 124 in the same row are separated by the through hole 122. A length of each connecting part 124 is equal to a space between adjacent through holes 122 in the same row along the first direction Y. Each extending part 126 is a connective structure along the first direction X. Each extending part 126 is sandwiched between adjacent connecting parts 126 in the second direction Y. A width of each extending part 126 in the second direction Y is equal to a space between adjacent through holes 122 in the second direction Y. The extending parts 126 connect with adjacent connecting parts 124 arranged along the second direction Y. In one embodiment, an effective length of each through hole 122 in the first direction X is larger than a space between adjacent through holes 122 along the second direction Y.

The shapes of the through holes or the space between adjacent through holes arranged in the same row or in the same column can be different. In the patterned carbon nanotube film, the arrangement of the connecting parts 124 is similar to the arrangement of the through holes 122. There are a few carbon nanotubes protruding around edges of each through holes 122, which is a result of the manufacturing process of the carbon nanotube film.

In step S30, the patterned carbon nanotube film is suspended. The step S30 can include dropping or spraying the solvent on the suspended patterned carbon nanotube film, and further shrinking the patterned carbon nanotube film into the carbon nanotube film. Because the carbon nanotubes in each extending part of the original carbon nanotube film are substantially joined end-to-end and substantially oriented along the first direction, and each extending part of the original carbon nanotube film is a consecutive structure on the first direction, the extending parts in the original carbon nanotube film are shrunk into the carbon nanotube linear units of the carbon nanotube film under interfacial tension. During the treating process with the solvent, each extending part of the patterned carbon nanotube film is substantially shrunk toward its center in the second direction and formed into the carbon nanotube linear unit, a space between adjacent extending parts will be increased. Therefore, the carbon nanotube linear units are spaced from each other in the carbon nanotube film. A space between adjacent carbon nanotube linear units in the carbon nanotube film is larger than the effective diameter of the through holes connected with the extending part or larger than the effective diameter of the through holes defined by the original carbon nanotube film in the second direction. Simultaneously, each connecting part will be drawn under the shrinking of the adjacent extending parts. The connecting part is formed into the carbon nanotube group in the carbon nanotube film. Therefore, the carbon nanotube film is formed.

An interfacial tension is generated between the patterned carbon nanotube film and the solvent, and the interfacial tension varies depending on the volatility of the solvent. Pulling tensions applied to the connecting parts are produced by the shrinking of the extending parts. The pulling tensions vary depending on the interfacial tension. The pulling tensions can affect the arrangement of the carbon nanotubes in the connecting parts, and further affect the structures of the carbon nanotube groups in the carbon nanotube film.

If the solvent is an organic solvent with a high volatility, such as alcohol, methanol, acetone, dichloroethane, or chloroform, the interfacial tension generated between the patterned carbon nanotube film and the solvent is strong. During the process of shrinking the extending parts, pulling forces are produced. The pulling forces applied to the connecting parts adjacent to the extending parts are strong. The carbon nanotubes oriented along the first direction in the connecting parts will be formed into the second carbon nanotubes extending along a direction crossing with the first direction. Simultaneously, under the interfacial tension, the carbon nanotubes in each connecting part will be shrunk and each connecting part will be formed into the carbon nanotube group with a net structure. In one embodiment, a first angle defined by the second carbon nanotubes and the first direction is greater than or equal to 45 degrees, and less than or equal to 90 degrees.

If the solvent is water, or a mixture of water and the organic solvent, the interfacial force between the patterned carbon nanotube film and the solvent is relatively weak. The pulling forces generated by the shrinking of the extending parts are weak, thus the pulling forces are weakly applied to the connecting parts. The arrangements of the carbon nanotubes in the connecting parts will be a little changed by the weak pulling forces. A second angle is defined by the second carbon nanotubes in the carbon nanotube groups with the first direction. The second angle is less than or equal to 30 degrees. In one embodiment, the second angle is less than or equal to 15 degrees. In one embodiment, the first solvent is water, and during the process of forming the carbon nanotube linear units, the arrangements of carbon nanotubes in the connecting parts are substantially not changed. Therefore, the second carbon nanotubes in the carbon nanotube groups are substantially parallel to the carbon nanotube linear units and the first direction.

In the step S20, if the through holes are arranged in rows, the carbon nanotube linear units made from the extending parts of the original carbon nanotube film, will be substantially parallel to each other. If the through holes are arranged in rows and columns, the extending parts will be formed into carbon nanotube linear units substantially extending along the first direction, and the carbon nanotube linear units are separately arranged on the second direction. At the same time, the connecting parts will be formed into the carbon nanotube groups, and the carbon nanotube groups will connect with the carbon nanotube linear units on the second direction and be spaced in the first direction. The carbon nanotube linear units, which are substantially parallel and separate on the second direction, form the first conductive paths substantially extending along the first direction. The carbon nanotube groups are connected with the carbon nanotube linear units in the second directions and spaced in the first direction, which form the second conductive paths extending along the second direction.

Therefore, the effective diameters of the carbon nanotube linear units can be selected by the spaces between adjacent through holes in the second direction and the shapes of the through holes. Spaces between adjacent carbon nanotube linear units can be controlled by the spaces between adjacent through holes in the second direction and the widths of through holes in the second direction. In one embodiment, the shape of the through holes is rectangular, the widths of the through holes in the second direction are equal, and the spaces between adjacent though holes in the same rows are equal. Therefore, the shapes and the effective diameters of the carbon nanotube linear units are respectively equal. Further, if the lengths of the through holes in the first directions are equal, the carbon nanotube groups will be substantially arranged in the second direction and the shapes of the carbon nanotube groups will be substantially the same. In conclusion, both the spaces between adjacent carbon nanotube linear units and the effective diameter of the carbon nanotube linear units can be effectively and easily adjusted according to the method for making the carbon nanotube film provided by the present disclosure.

Under the same condition, a resistance of the carbon nanotube film along the first direction is not affected by the number of the through holes arranged along the first direction. The more through holes that are arranged along the first direction, the higher a resistance of the carbon nanotube film along the second direction. The less through holes that are arranged along the first direction, the lower the resistance of the carbon nanotube film along the second direction. Under the same condition, the resistance of the carbon nanotube film along the second direction is not affected by the number of the through holes in the original carbon nanotube film along the second direction. The more through holes that are arranged along the second direction, the higher a resistance of the carbon nanotube film along the first direction. The less through holes that are arranged along the second direction, the lower the resistance of the carbon nanotube film along the first direction. Therefore, the resistance of the carbon nanotube film, especially the electrical anisotropy of the carbon nanotube film, can be changed by the number of the through holes in the patterned carbon nanotube film. That is, the step S20 can affect the resistance of the carbon nanotube film.

It is noted that, the electrical conductivity of the carbon nanotube film can be affected by parameters of the through holes. If the through holes are uniformly distributed in the patterned carbon nanotube film and each through hole is rectangular, the length of each through hole in the first direction is marked as parameter A, the width of each through hole in the second direction is marked as parameter B, the space between adjacent through holes in the first direction is marked as parameter C, and the space between adjacent through holes in the second direction is marked as parameter D. In one embodiment, the parameter A is smaller than the parameter D. If compared with the parameter A, the parameter B is relatively small, the through holes can be considered as straight lines. The affect of the parameters of the through holes on the resistance and electrical anisotropy of the carbon nanotube film can be detailed below:

(1) If the parameters A and B are constant, the ratio of the resistance of the carbon nanotube film along the second direction to the resistance of the carbon nanotube film along the first direction is increased as the ratio of the parameter A to parameter B (A/B) increases. The electrical anisotropy of the carbon nanotube film is proportional to the ratio of the parameter A to parameter B.

(2) If the parameters A and C are constant, the resistance of the carbon nanotube film at the first direction is increased as the ratio of the parameter B to parameter D (B/D) increases.

(3) If the parameters B and D are constant, the resistance of the carbon nanotube film along the second direction is increased as the ratio of the parameter A to parameter C (A/C) increases. In addition, the electrical anisotropy of the carbon nanotube film can be improved by decreasing the ratio of the parameter A to the parameter C.

The method for making the carbon nanotube film further includes a step of collecting the carbon nanotube film. Specifically, one end of the original carbon nanotube film drawn from the carbon nanotube array is fixed on a collecting unit. The collecting unit is rotated, the original carbon nanotube film can be continuously patterned and treated with the solvent in order, and then the carbon nanotube film is continuously formed and collected on the collecting unit. Thus, the carbon nanotube film can be continuously formed as rotating the collecting unit. The carbon nanotube film can be produced automatically. It can be understood that the collecting unit also can be a fixing element used to fix the original carbon nanotube film, such as a bar.

The carbon nanotube films and the methods for making the carbon nanotube films can be further described in the following embodiments.

Figure 5:
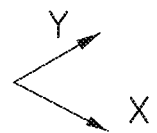
FIG. 5 is a schematic view of one embodiment of a carbon nanotube film including a number of carbon nanotube groups substantially arranged in an array.
Figure 5:
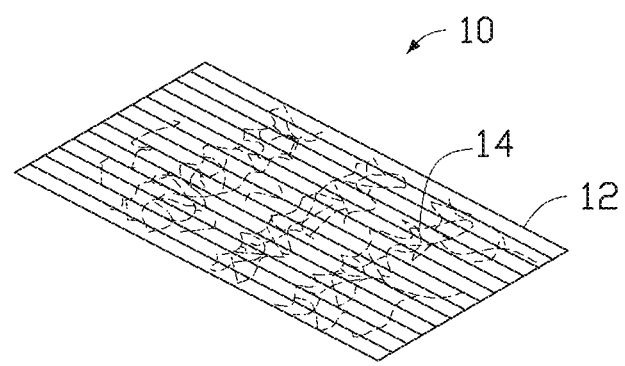

Referring to FIG. 5, one embodiment of carbon nanotube film 10 is provided. The carbon nanotube film 10 is a free-standing structure, and includes a number of carbon nanotube linear units 12 and a number of carbon nanotube groups 14. The carbon nanotube groups 14 are connected with the carbon nanotube linear units 12 by van der Waals force. The carbon nanotube linear units 12 are inserted into the carbon nanotube groups 14.

The carbon nanotube linear units 14 are substantially parallel to each other and separate from each other along the second direction Y. The carbon nanotube linear units 14 extend along the first direction X which is substantially perpendicular to the second direction Y, to form the first conductive paths. Each carbon nanotube linear unit 12 consists of carbon nanotubes joined end-to-end by van der Waals force and substantially extend along the first direction X. The intersection shape of each carbon nanotube linear unit 12 is circular. The diameter of the carbon nanotube linear unit 12 is about 10 micrometers. The space between adjacent carbon nanotube linear units 12 is wider than 1 millimeter.

The carbon nanotube groups 14 are arranged in an array. Specifically, the carbon nanotube groups 14 are spaced from each other along the first direction X. The carbon nanotube groups 14 are orderly arranged along the second direction Y and connected with the carbon nanotube linear units 12 to form the second conductive paths. Each carbon nanotube group 14 includes the carbon nanotubes crossed to form a network structure. Angles defined by the extending directions of the carbon nanotube in the carbon nanotube groups with the first direction X, are greater than or equal to 60 degrees, and less than or equal to 90 degrees.

The carbon nanotube film 10 has different structures in the first direction X and the second direction Y. Therefore, the carbon nanotube film 10 has different properties in the first and second direction. The carbon nanotube film 10 is an electrically anisotropic film. The resistance of the carbon nanotube film 10 in the second direction Y is about 50 times greater than that in the first direction X. The transparence of the carbon nanotube film 10 can reach up to 98.43% in the visible light region.

Figure 6:
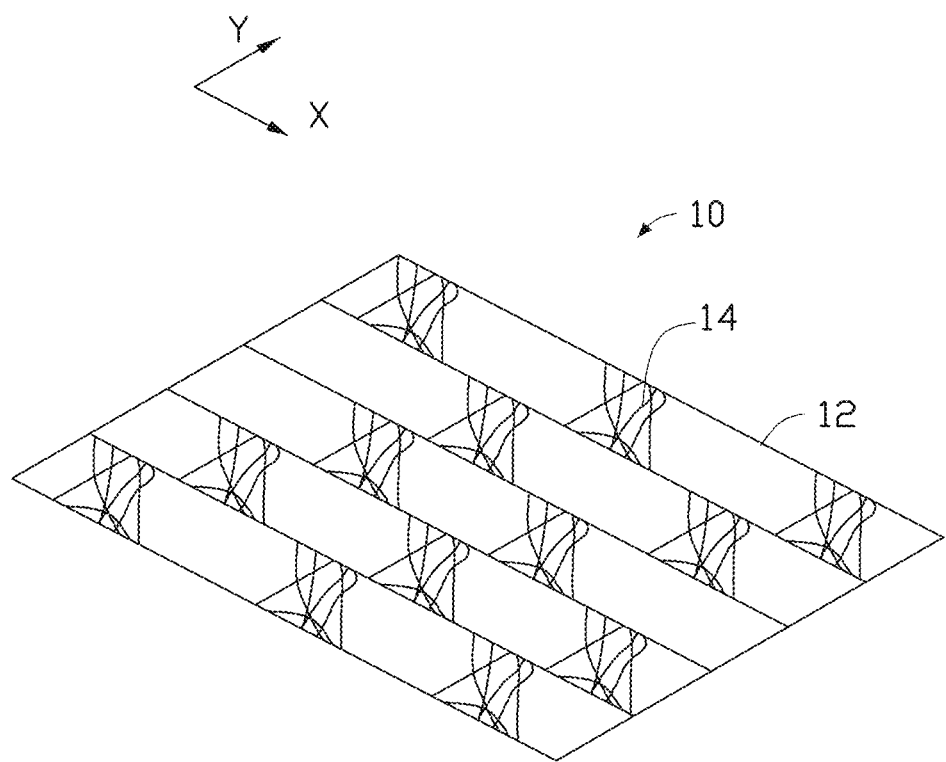
FIG. 6 is a schematic view of one embodiment of a carbon nanotube film including a number of carbon nanotube groups interlaced with each other.

It can be understood that the carbon nanotube film 10 can also have a structure as shown in FIG. 6, in which the carbon nanotube groups 14 are in a staggered arrangement in the second direction Y. Specifically, the carbon nanotube groups 14 are arranged in rows in the first direction X, and disorderly arranged in the second direction Y. In another embodiment, the carbon nanotube groups 14 are in a staggered arrangement in the first direction X. That is, the carbon nanotube groups 14 are arranged in columns in the second direction Y, and disorderly arranged in the first direction X.

Figure 7:
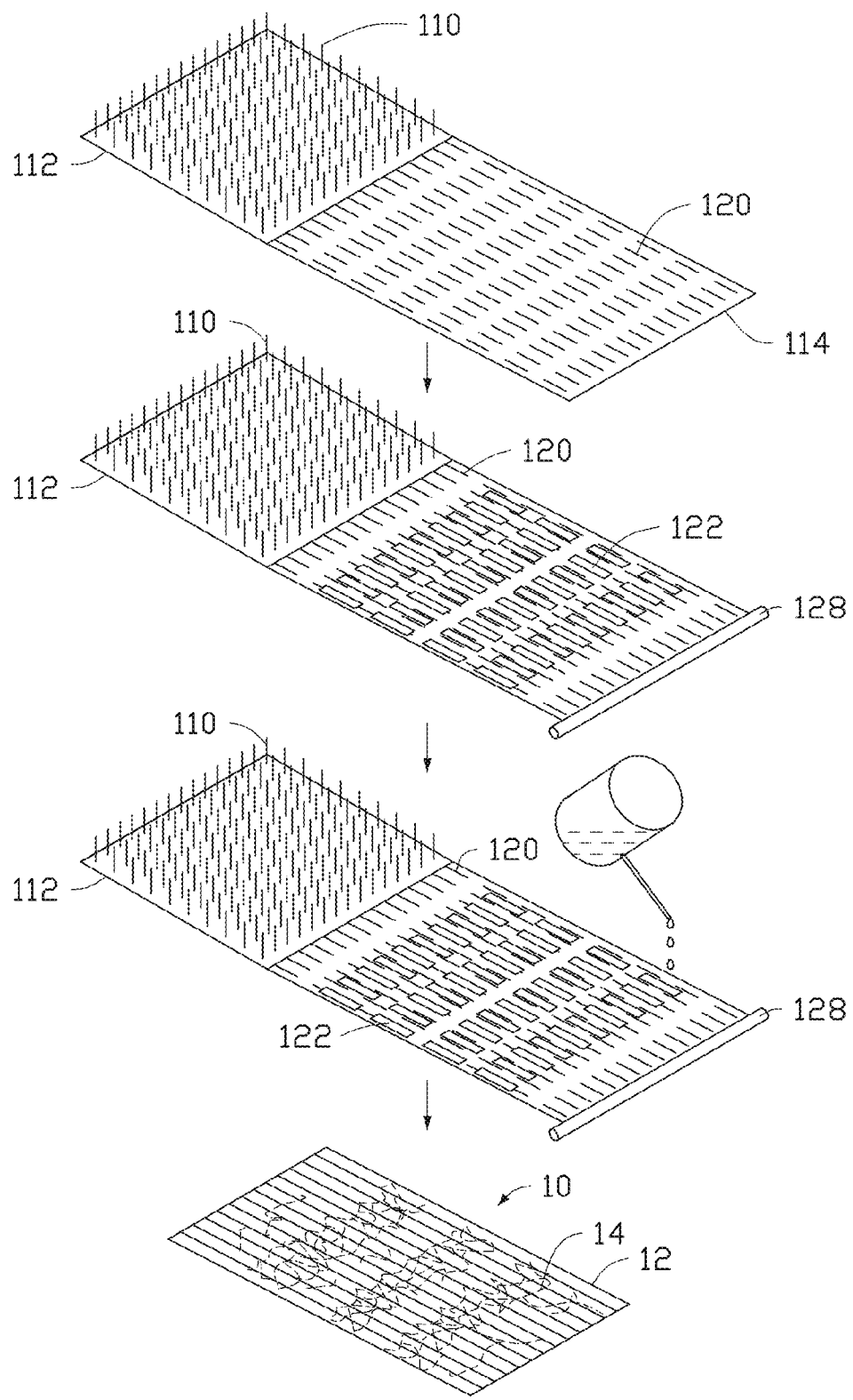
FIG. 7 is a flow chart of one embodiment of a method for making a carbon nanotube film.

Referring to FIG. 7, one embodiment of the method for making the carbon nanotube film 10 is provided. The method includes the following steps.

A carbon nanotube array 110 is provided. The carbon nanotube array 10 is grown on a substrate 112. An original carbon nanotube film 120 is drawn from the carbon nanotube array 110 using an adhesive tape 114. The original carbon nanotube film 120 includes a number of carbon nanotubes joined end to end by van der Waals force and substantially extending along the first direction X.

Figure 8:
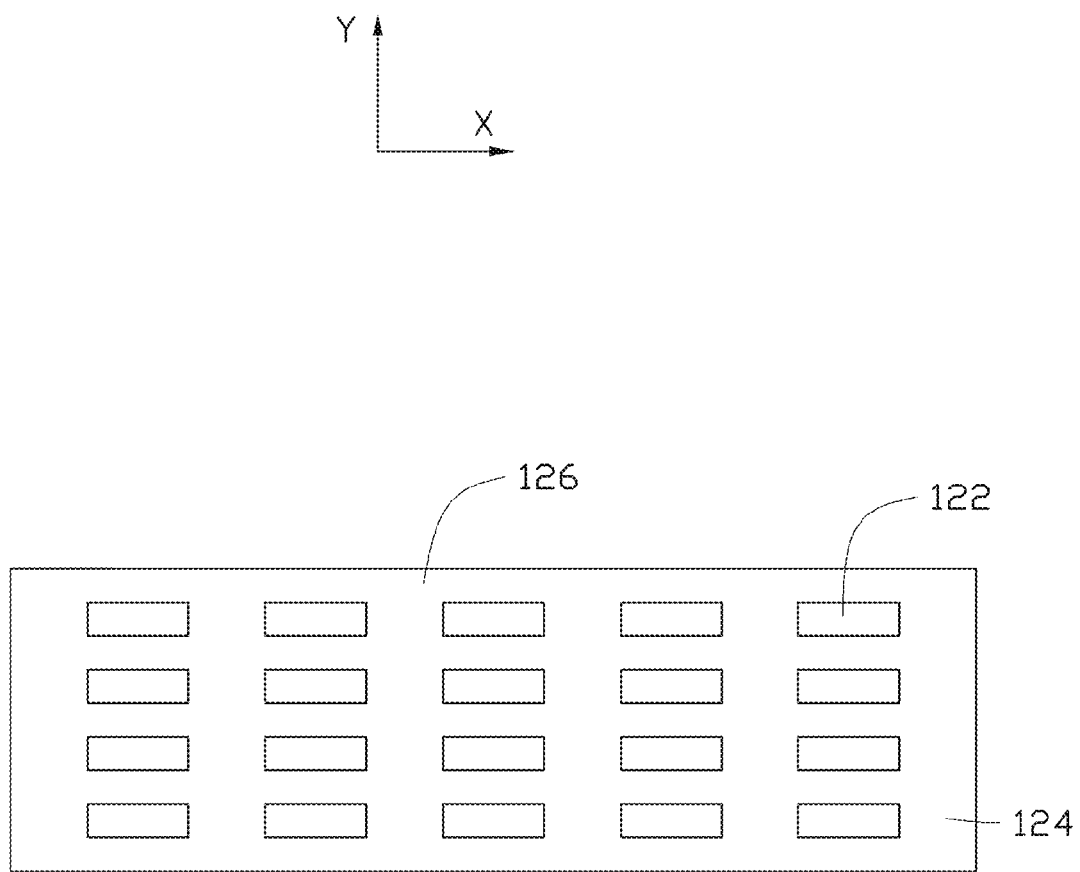
FIG. 8 is a schematic view of the original carbon nanotube film shown in FIG. 2 including through holes.
Figure 9:
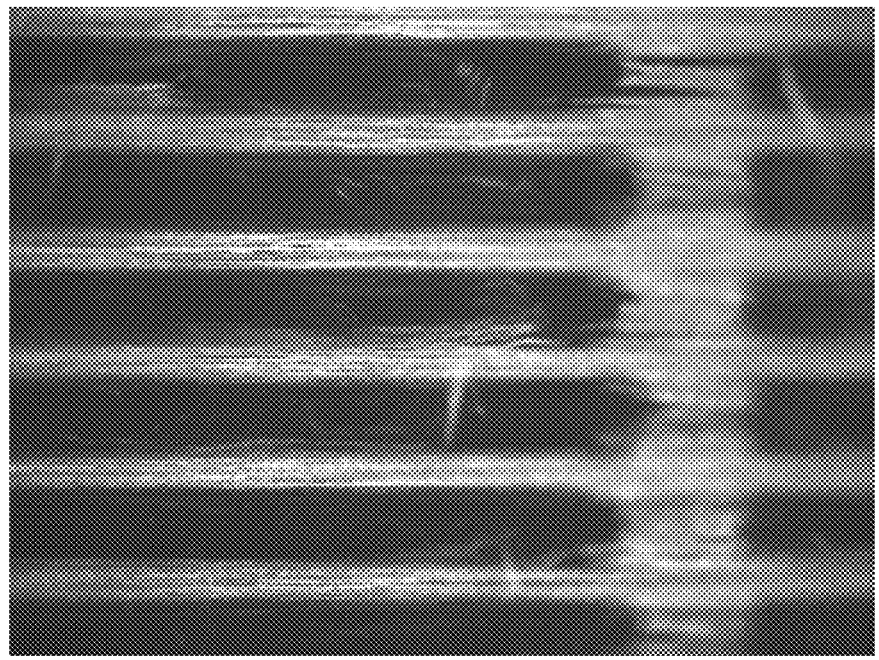
FIG. 9 is an optical microscope image of the original carbon nanotube film including through holes shown in FIG. 8.

The adhesive tape 114 is removed. The end of the original carbon nanotube film 120 adhered to the adhesive tape 114, is fixed on a fixing element 128. The fixing element 128 is a bar. The original carbon nanotube film 120 between the fixing element 128 and the carbon nanotube array 110 is suspended. The suspended original carbon nanotube film 120 is patterned by a laser with a power density of about 70000 watts per square millimeter, and a scanning speed of about 1100 millimeters per seconds. A number of rectangular through holes 122 are defined in the original carbon nanotube film 120. Referring to FIGS. 8 and 9, the patterned carbon nanotube film 120 is divided into a number of connecting parts 124 and a number of extending parts 126 by the through holes 122. The connecting parts 124 are arranged in an array, which is similar to the arrangement of the through holes 122. The spaces between adjacent through holes 122 both in the first direction X and the second direction Y are about 1 millimeter. The length of the through hole 122 in the first direction X is about 3 millimeters. The width of the through hole 122 in the second direction Y is about 1 millimeter. That is, the parameters A, B, C and D of each through hole 122 are respectively about 3 millimeters, 1 millimeter, 1 millimeter, and 1 millimeter. Thus, the lengths of the connecting part 124 in the first direction X and the second direction Y are about 1 millimeter. The width of the extending part 126 in the second direction Y is equal to the parameter D of the through hole 122.

A drop bottle 130 is placed above the patterned carbon nanotube film 120. Alcohol 132 from the drop bottle 130 is dropped onto the patterned carbon nanotube film 120. Under interfacial tension produced between the extending part 126 and the alcohol 132, each extending part 126 is shrunk toward its center to form the carbon nanotube linear unit 12. Simultaneously, a pulling tension is produced in the process of the shrinking of the extending part 126. Under the pulling tension and the interfacial tension produced between the connecting part 124 and the alcohol 132, extending directions of most of the carbon nanotubes in the connecting part 124 are shifted into directions intersecting with the first direction, and the carbon nanotube group 14 is formed. The carbon nanotube groups 14 are connected with the carbon nanotube linear units 12 in the second direction, and separated from each other in the first direction. Thus, the carbon nanotube film 10 is formed.

Figure 10:
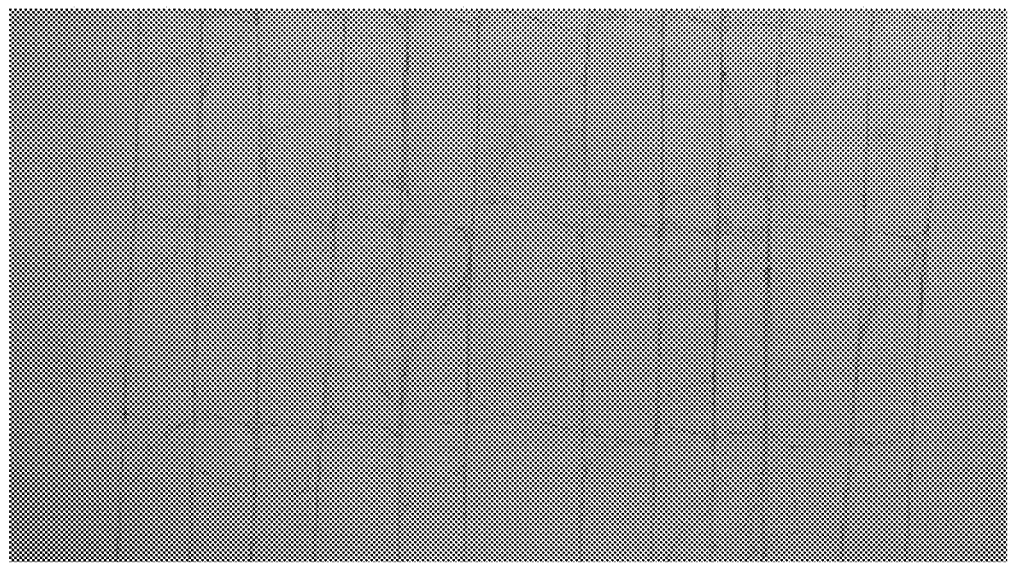
FIG. 10 is an optical microscope image of a carbon nanotube film made by the process shown in FIG. 7.
Figure 11:
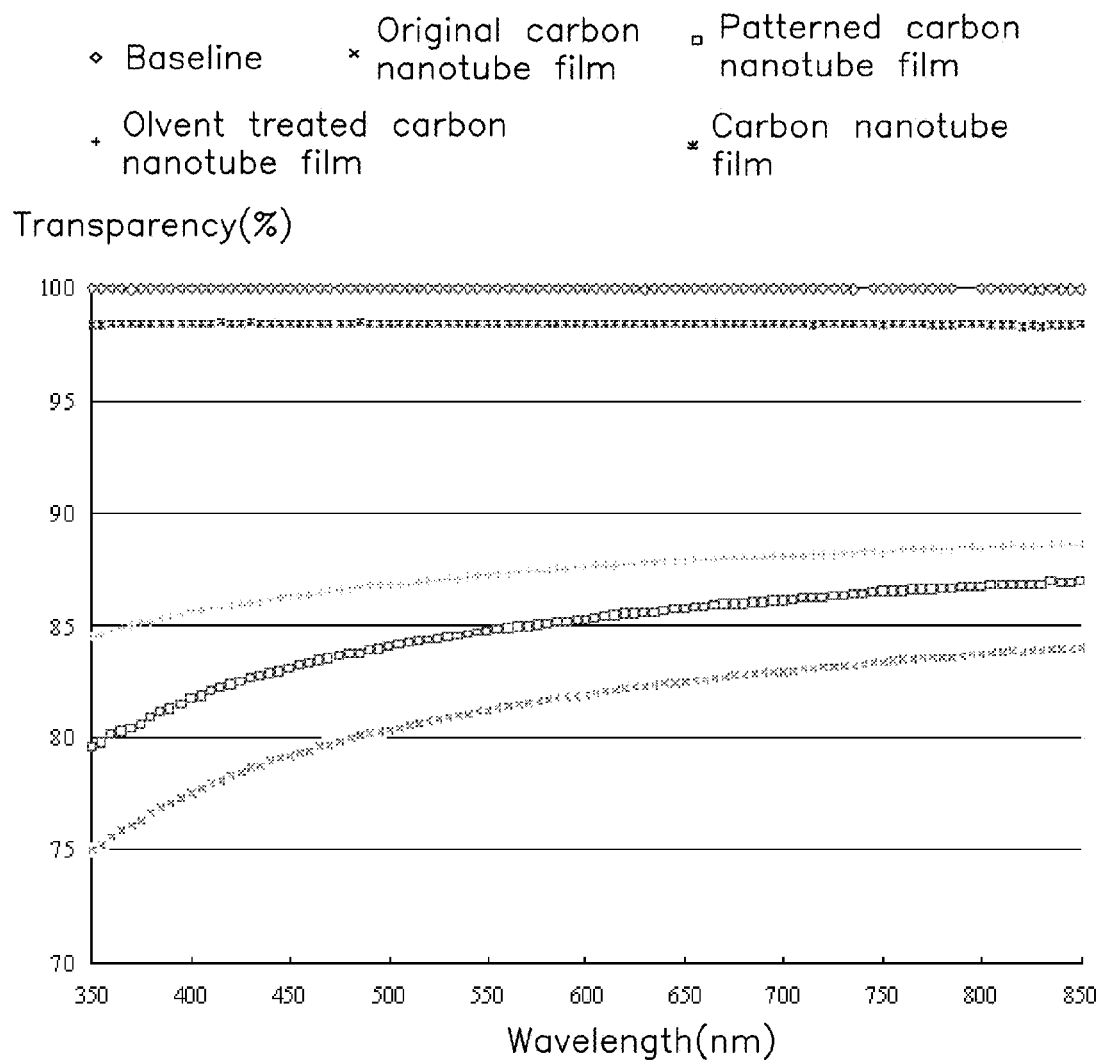
FIG. 11 shows transparent chart views of different kinds of films including carbon nanotubes.

There are some carbon nanotubes protruding from the edges of the through holes 122 resulting from limitations of the laser. After the process of treatment with the solvent, there can still be a few carbon nanotubes shown in FIG. 10 extending from the peripheries of the carbon nanotube linear units 12 and the carbon nanotube groups 14.

If the through holes are arranged in the staggered, disordered arrangement in the second direction Y as shown in FIG. 4, the carbon nanotube film shown in FIG. 6 obtained by the above-mentioned method, includes the staggered carbon nanotube groups.

The carbon nanotube film 10 is transparent and electrically conductive. In table 1, the sample "1" represents the original carbon nanotube film 120, sample "2" represents a patterned carbon nanotube film formed by using a laser irradiate the original carbon nanotube film 120 to form a number of through holes in the original carbon nanotube film, sample "3" represents an alcohol treated carbon nanotube film made by using alcohol soak the original carbon nanotube film 120 to shrink the original carbon nanotube film, and sample "4" represents the carbon nanotube film 10 formed by the original carbon nanotube film that has been laser treated and then alcohol treated in sequence. "X" represents the first direction X, which is the carbon nanotubes in the samples extending direction, and "Y" represents the second direction Y, which is substantially perpendicular to the first direction X. Resistances of the samples 1-4 are measured by adhering the samples with 3 millimeters×3 millimeters to PET sheets. The samples 1-4 are adhered to the PET sheets by a mixture of UV adhesive and butyl acetate 1:1 by volume. The transparence of the samples 1-4 are measured in suspended state under different wavelengths.

TABLE 1

| sample | Resistance/ KΩ | | Transparence under different wavelengths/% | | | | | | | |
|---|---|---|---|---|---|---|---|---|---|---|
| | X | Y | 370 nm | 450 nm | 500 nm | 550 nm | 600 nm | 650 nm | 700 nm | 750 nm |
| 1 | 1.245 | 108.0 | 76.08 | 79.17 | 80.31 | 81.2 | 81.88 | 82.46 | 82.92 | 83.32 |
| 2 | 2.00 | 160.5 | 80.39 | 83.03 | 84.01 | 84.73 | 85.27 | 85.78 | 86.14 | 86.51 |
| 3 | — | — | 84.98 | 86.33 | 86.81 | 87.29 | 87.62 | 87.92 | 88.10 | 88.29 |
| 4 | 3.23 | 163.3 | 98.43 | 98.42 | 98.41 | 98.43 | 98.40 | 98.45 | 98.42 | 98.38 |

From the table 1, the resistance of the carbon nanotube film 10 in every direction is larger than the resistances of the original carbon nanotube film 120 and the patterned carbon nanotube film in their corresponding direction. But the carbon nanotube film 10 is still an anisotropic and electrically conductive film, and the resistance of the carbon nanotube film 10 in the second direction is over 50 times greater than that in the first direction X. The transparence of the carbon nanotube film 10 is better than that of the original carbon nanotube film 120 and the patterned carbon nanotube film under each wavelength. Further, the transparence of the carbon nanotube film 10 is higher than 98% in the visible region.

Figure 12:
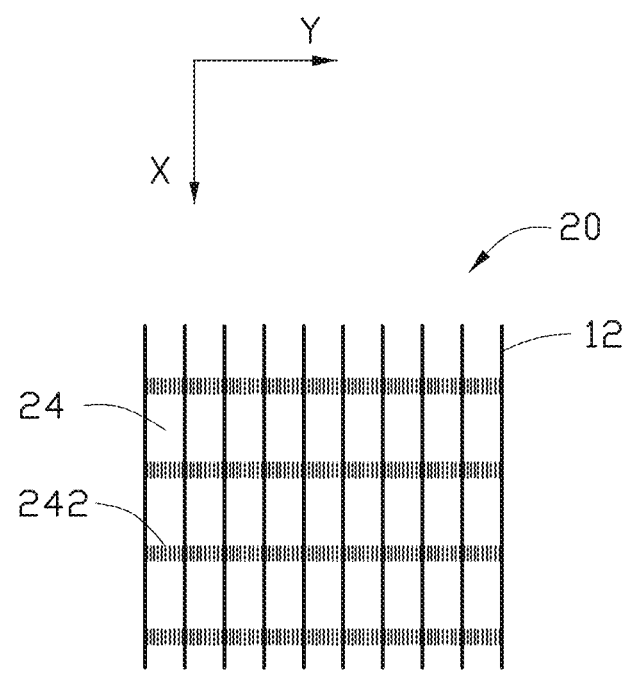
FIG. 12 is a schematic view of another embodiment of a carbon nanotube film.
Figure 13:
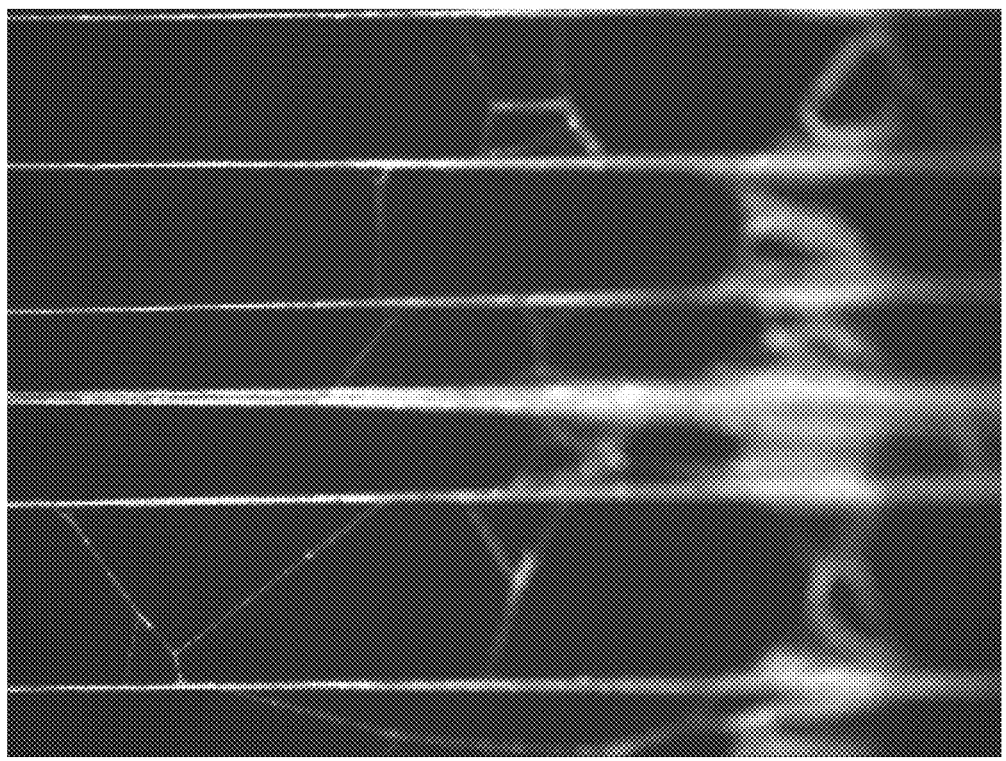
FIG. 13 is an optical microscope image of the carbon nanotube film shown in FIG. 12.

Referring to FIGS. 12 and 13, one embodiment of a carbon nanotube film 20 is provided. The carbon nanotube film 20 includes a number of the carbon nanotube linear units 12 and a number of carbon nanotube groups 24 arranged in an array. The structure of the carbon nanotube film 20 is similar to that of the carbon nanotube film 10, except that the carbon nanotube groups 24 includes a number of carbon nanotubes substantially extending along the first direction X. The carbon nanotube linear units extend along the first direction X. That is, the carbon nanotubes in the carbon nanotube film 20 are substantially oriented along the same direction, which is the same as the extending direction of the carbon nanotube linear units.

A method for making the carbon nanotube film 20 is similar to the method for making the carbon nanotube film 10, expect that in the step S30, water is used as the solvent to treat the patterned carbon nanotube film having a number of through holes formed by laser.

The parameters A, B, C, and D of the through holes affect the properties of the carbon nanotube film provided by the present disclosure. The affection can be specifically explained in the following scenarios. In the following scenarios, the through holes are uniformly arranged in the original carbon nanotube film as an array.

(Scenario I) the parameters of A and C are constant to determine how parameters B and D affect the carbon nanotube film.

First, the original carbon nanotube films have undergone the different treated conditions shown in table 2 to form the samples. Secondly, the samples are adhered to the PET sheets. Specifically, UV adhesive is mixed with butyl acetate in 1:1 by volume forming a mixture. The mixture is coated on the PET sheets, and the samples are covered with the mixture to adhere to the PET sheets. The samples adhered to the PET sheets are made into 3 millimeters×3 millimeters sheets, and then used to measure the resistances of the sample. In table 2, all experiment conditions are acted on the original carbon nanotube film, the transparence of the samples is measured under about 550 nanometers wavelengths, the "parallel resistance" is the resistance of the samples in the first direction, which is substantially parallel to the extending directions of the carbon nanotubes in the samples, and the "perpendicular resistance" is the resistance of the samples in the second direction, which is substantially perpendicular to the extending directions of the carbon nanotubes in the samples. The transparence of the PET sheet adhered solidified UV adhesive is about 91.40% under the wavelengths of about 550 nanometers.

TABLE 2

| sample | parameter/ millimeter | | | | treated condition | parallel resistance | perpendicular resistance | transparence/ % | |
|---|---|---|---|---|---|---|---|---|---|
| | A | B | C | D | | | | | |
| 1 | 3 | 0.9 | 1 | 0.6 | laser treated | 3.2 KΩ | 118.5 KΩ | 80.84 | 81.51 |
| 2 | | | | | laser treated and then alcohol treated | 2.07 KΩ | 46.9 KΩ | 89.68 | 89.11 |
| 3 | 3 | 0.7 | 1 | 0.8 | laser treated | 2.1 KΩ | 90.4 KΩ | 79.47 | 79.43 |

TABLE 2-continued

| sample | parameter/millimeter | | | | treated condition | parallel resistance | perpendicular resistance | transparence/% | |
|---|---|---|---|---|---|---|---|---|---|
| | A | B | C | D | | | | | |
| 4 | | | | | laser treated and then alcohol treated | 1648 Ω | 50.1 KΩ | 90.11 | 89.86 |
| 5 | 3 | 0.5 | 1 | 1 | laser treated | 1862 Ω | 92.6 KΩ | 78.63 | 77.97 |
| 6 | | | | | laser treated and then alcohol treated | 1712 Ω | 74.9 KΩ | 89.35 | 90.33 |
| 7 | 3 | 0.3 | 1 | 1.2 | laser treated | 1510 Ω | 103.6 KΩ | 78.48 | 79 |
| 8 | | | | | laser treated and then alcohol treated | 1283 Ω | — | 89.79 | 90.1 |
| 9 | | — | | | original carbon nanotube film | 964 Ω | 33.8 KΩ | 75 | 73.41 |

It can be seen from the table 2 that when the original carbon nanotube film has undergone the laser treatment and then the alcohol treatment to form the carbon nanotube film, the transparence of the carbon nanotube film is close to the transparence of the PET sheet with solidified UV adhesive. Therefore, the carbon nanotube film is excellent in transparence. Having the parameters A and C constant, the parallel resistances of the samples increase as the ratio of the parameter B to parameter D (B/D) increases, and the parallel resistances of the samples are not affected whether the original carbon nanotube films have undergone the shrinking process from the solvent treatment. In one embodiment, the ratio of the parameter B to the parameter D is less than or equal to 2, and the parallel resistances are greater than or equal to 1 KΩ. The shrinking process from the solvent treatment, under the same through hole parameters results in the perpendicular resistances of the carbon nanotube films being greatly lower than the perpendicular resistances of the patterned carbon nanotube films, and the electrical anisotropy of the carbon nanotube film is increased. The transparence of the carbon nanotube film can be improved, and the resistance can be minimally increased. The transparence can be improved, at the same time, the resistance can be increased.

(Scenario II) the parameters of B and D are constant to determine how the parameters A and C affect the carbon nanotube film.

Samples shown in table 3 are made by the similar methods to the samples shown in table 2. The differences are the parameters of the through holes for forming the samples.

It can be seen from the table 2 that when the parameters B and D are constant, the perpendicular resistances of the carbon nanotube film increase as the ratio of the parameter A to parameter C (A/C) increases. The perpendicular resistances of the samples are not affected whether the original carbon nanotube films have undergone the shrinking process from the solvent treatment. In one embodiment, the ratio of the parameter A to the parameter C is greater than or equal to 0.5, and the perpendicular resistances are greater than 30 KΩ. The electrical anisotropy of the carbon nanotube film can be improved as the ratio of the parameter A to parameter C increases. The solvent treatment process is not conducive to improving the electrical anisotropy of the carbon nanotube film.

Tension of the Carbon Nanotube Film

The term "tension" in the text means that minimal pulling forces applied to various carbon nanotube structures, which can break the carbon nanotube structures. The carbon nanotube structures include an original carbon nanotube film, a patterned carbon nanotube film, and a carbon nanotube film provided by the present disclosure. In one embodiment, a width of the original carbon nanotube film is about 15 millimeters, and a tension of the original carbon nanotube film is about 150 milli-Newtons (mN). A width of the patterned carbon nanotube film is about 15 millimeters, and a tension of the patterned carbon nanotube film is about 47 mN; wherein, the patterned carbon nanotube film includes a number of uniformly dispersed through holes, the parameters A, B, C and D of the through holes are respectively 3 millimeters, 0.35 millimeters, 0.8 millimeters, and 0.35

TABLE 3

| sample | parameter/millimeter | | | | treated condition | parallel resistance | perpendicular resistance | transparence/% | |
|---|---|---|---|---|---|---|---|---|---|
| | A | B | C | D | | | | | |
| 1 | 3 | 0.5 | 1 | 1 | laser treated | 1774 Ω | 118.4 KΩ | 79.39 | 79.34 |
| 2 | | | | | laser treated and then alcohol treated | 1656 Ω | 88.8 KΩ | 90.01 | 90.10 |
| 3 | 2.5 | 0.5 | 1.5 | 1 | laser treated | 1692 Ω | 80 KΩ | 78.43 | 77.80 |
| 4 | | | | | laser treated and then alcohol treated | 1600 Ω | 53.3 KΩ | 89.72 | 89.95 |
| 5 | 2.0 | 0.5 | 2.0 | 1 | laser treated | 1653 Ω | 62.1 KΩ | 77.63 | 77.39 |
| 6 | | | | | laser treated and then alcohol treated | 1666 Ω | 48.4 KΩ | 89.55 | 89.59 |
| 7 | 1.5 | 0.5 | 2.5 | 1 | laser treated | 1502 Ω | 46.3 KΩ | 76.37 | 76.66 |
| 8 | | | | | laser treated and then alcohol treated | 1406 Ω | 34.0 KΩ | 89.40 | 89.25 |
| 9 | | — | | | original carbon nanotube film | 909 Ω | 42.6 KΩ | 73.06 | 73.56 | millimeters. A tension of the carbon nanotube film is about 105 mN. Wherein, the carbon nanotube film is made from the patterned original carbon nanotube film with a width about 15 millimeters. In one embodiment, the tension of the carbon nanotube film is greater than or equal to 90 mN.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A method for making a carbon nanotube film, comprising:
   providing a carbon nanotube array;
   drawing an original carbon nanotube film comprising a plurality of carbon nanotubes substantially joined end-to-end by van der Waals force and oriented along a first direction from the carbon nanotube array;
   suspending the original carbon nanotube film between the carbon nanotube array and a fixing element;
   irradiating the original carbon nanotube film suspended between the carbon nanotube array and a fixing element along the first direction to form a patterned carbon nanotube film, wherein a portion of the original carbon nanotube film which is irradiated is completely removed, a plurality of through holes are formed and arranged in a plurality of rows in the first direction, each row comprises at least two spaced though holes, a shape of each of the plurality of through holes is rectangular, and each of the plurality of through holes extends along the first direction; a length of each through hole along the first direction is defined as parameter A, a width of each through hole in is defined as parameter B, a first space between adjacent through holes along the first direction is defined as parameter C, a second space between adjacent through holes at adjacent two rows is defined as parameter D, A ranges from 1 millimeter to 3 millimeters, B ranges from 0.1 millimeters to 1 millimeter, C ranges from 1 millimeter to 2.5 millimeters, and D range from 0.6 millimeters to 1 millimeter; a first ratio of the parameter B to the parameter D is less than or equal to 2, and a second ratio of the parameter A to the parameter C is greater than or equal to 0.5; and
   applying a solvent on the patterned carbon nanotube film suspended between the carbon nanotube array and a fixing element to shrink the suspended patterned carbon nanotube film into the carbon nanotube film comprising a plurality of spaced and parallel carbon nanotube linear units and a plurality of carbon nanotube groups, and the plurality of carbon nanotube groups are joined with the plurality of carbon nanotube linear units by van der Waals force, and a ratio of a first area of the plurality of carbon nanotubes to a second area of the plurality of through holes is less than or equal to 1:19.

2. The method of claim 1, wherein the forming of the patterned carbon nanotube film comprises using a laser beam or an electron beam to irradiate the original carbon nanotube film to define the through holes in the original carbon nanotube film.

3. The method of claim 1, wherein the forming of the patterned carbon nanotube film comprises patterning the original carbon nanotube film to form the through holes, and the through holes are separated from each other and arranged in one row along the first direction in the original carbon nanotube film.

4. The method of claim 1, wherein the forming of the patterned carbon nanotube film comprises patterning the original carbon nanotube film to form the through holes, and the through holes are separated from each other and arranged in a plurality of rows along the first direction in the original carbon nanotube film.

5. The method of claim 4, wherein the through holes are arranged in a plurality of columns along a second direction in the original carbon nanotube film, the through holes arranged in a same column are spaced from each other, the second direction is crossed with the first direction.

6. The method of claim 5, wherein a length of each through hole in the first direction is greater than a space between adjacent through holes in the second direction.

7. The method of claim 5, wherein spaces between adjacent through holes in the second direction is greater than widths of the through holes in the second direction.

8. The method of claim 4, wherein the through holes are interlaced with each other in a second direction crossed with the first direction.

9. The method of claim 1, wherein the providing the original carbon nanotube film comprises providing a carbon nanotube array; and drawing the original carbon nanotube film from the carbon nanotube array substantially along the first direction.

10. The method of claim 9, wherein the forming of the patterned carbon nanotube film comprises: fixing one end of the original carbon nanotube film on a fixing element and suspending the original carbon nanotube film between the fixing element and the carbon nanotube array; and then using a leaser beam or an electron beams irradiate the original carbon nanotube film to form the patterned carbon nanotube film.

11. The method of claim 1, wherein the solvent is selected from at least one of the group consisting of alcohol, methanol, acetone, dichloroethane, chloroform, and water.

12. The method of claim 1, wherein A is 3 millimeter, B is 1 millimeter, C is 1 millimeter, and D is 1 millimeter.

13. The method of claim 1, wherein the ratio is less than or equal to 1:49.

14. The method of claim 1, wherein the parameter A is 3 millimeters, the parameter B is 0.7 millimeters, the parameter C is 1 millimeter, and the parameter D is 0.8 millimeters.

15. The method of claim 1, wherein the parameter A is 2.0 millimeters, the parameter B is 0.5 millimeters, the parameter C is 2.0 millimeters, and the parameter D is 1 millimeter.

* * * * *